(12) United States Patent
Park et al.

(10) Patent No.: US 12,409,881 B2
(45) Date of Patent: Sep. 9, 2025

(54) STEERING ACTUATOR APPARATUS FOR VEHICLE

(71) Applicant: HYUNDAI MOBIS CO., LTD., Seoul (KR)

(72) Inventors: Sang Jun Park, Yongin-si (KR); Su Ju Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 490 days.

(21) Appl. No.: 18/067,620

(22) Filed: Dec. 16, 2022

(65) Prior Publication Data
US 2023/0219614 A1    Jul. 13, 2023

(30) Foreign Application Priority Data
Jan. 10, 2022    (KR) ........................ 10-2022-0003284

(51) Int. Cl.
*B62D 5/00*    (2006.01)
*B62D 5/04*    (2006.01)

(52) U.S. Cl.
CPC ........... *B62D 5/006* (2013.01); *B62D 5/0448* (2013.01); *B62D 5/0481* (2013.01)

(58) Field of Classification Search
CPC .... B62D 5/006; B62D 5/0448; B62D 5/0481; B62D 5/0424; B62D 5/001; B62D 15/0225; B62D 5/0421
See application file for complete search history.

(56) References Cited

U.S. PATENT DOCUMENTS

| 2008/0011537 A1* | 1/2008 | Ozsoylu | B62D 5/0442 |
| | | | 701/41 |
| 2019/0233000 A1* | 8/2019 | Matsuda | B62D 5/006 |
| 2019/0329816 A1* | 10/2019 | Ko | B62D 5/0424 |
| 2019/0351932 A1* | 11/2019 | Washnock | B62D 5/0454 |
| 2020/0156702 A1* | 5/2020 | Dodak | G01D 5/145 |

(Continued)

FOREIGN PATENT DOCUMENTS

| CN | 113147886 A | * 7/2021 | ........... B62D 5/0421 |
| KR | 10-2009-0116183 | 11/2009 | |

(Continued)

OTHER PUBLICATIONS

English Language Abstract of KR 10-2009-0116183 published Nov. 11, 2009.

*Primary Examiner* — Paul N Dickson
*Assistant Examiner* — Matthew D Lee
(74) *Attorney, Agent, or Firm* — DLA PIPER LLP (US)

(57) ABSTRACT

A steering actuator apparatus for a vehicle may include: a housing, a driving unit configured to be supported by the housing and generates a driving force, a transmission shaft, which is installed inside the housing to be movable, moves back and forth by receiving the driving force from the driving unit, and varies a steering angle of a wheel, a measurement unit configured to measure the steering angle of the wheel in conjunction with a movement of the transmission shaft, a first rotation prevention unit provided between the housing and the transmission shaft and fixed to the transmission shaft and a second rotation prevention unit, which is detachably coupled to an outside of the housing and interferes with the first rotation prevention unit to prevent relative rotation of the housing and the transmission shaft.

15 Claims, 12 Drawing Sheets

(56) References Cited

U.S. PATENT DOCUMENTS

| | | | |
|---|---|---|---|
| 2022/0048560 A1* | 2/2022 | Tae | B62D 6/002 |
| 2022/0111886 A1* | 4/2022 | Han | B62D 5/0448 |
| 2022/0355853 A1* | 11/2022 | Seo | B62D 5/046 |
| 2023/0011733 A1* | 1/2023 | Park | B62D 5/0448 |
| 2023/0213064 A1* | 7/2023 | Feng | B62D 5/001 |
| | | | 280/428 |
| 2023/0219614 A1* | 7/2023 | Park | B62D 5/0424 |
| | | | 180/443 |
| 2024/0034391 A1* | 2/2024 | Case Myers | F16H 25/2015 |

FOREIGN PATENT DOCUMENTS

| | | | | |
|---|---|---|---|---|
| KR | 20240174001 A | * | 12/2024 | B62D 5/0421 |
| KR | 20240178421 A | * | 12/2024 | B62D 5/046 |

* cited by examiner

STEERING ACTUATOR APPARATUS FOR VEHICLE

CROSS-REFERENCE TO RELATED APPLICATION

This application claims priority from and the benefit of Korean Patent Application No. 10-2022-0003284, filed on Jan. 10, 2022, which is hereby incorporated by reference for all purposes as if set forth herein.

BACKGROUND

Technical Field

Exemplary embodiments of the present disclosure relate to a steering actuator apparatus for a vehicle, and more particularly, to install in a Steer By Wire (SBW).

Discussion of the Background

In general, a Steer By Wire (SBW) system is a steering system that separates a mechanical connection between a steering wheel and a driving wheel of a vehicle, which receives a rotation signal of the steering wheel through an electronic control unit (ECU) and operates a steering motor connected to the driving wheel based on an input rotation signal. The Steer By Wire (SBW) system has advantages such as increasing layout freedom according to a steering system configuration, improving fuel efficiency, and removing disturbances reversely input from the wheels by removing a mechanical connection structure of the existing steering system. The SBW system consists of a steering wheel for a driver to input a steering angle, a reaction device that gives the driver a sense of reaction, and a steering actuator that rotates a tire.

When a rack-driven steering actuator is applied to the SBW system, a sensor is required to detect a steering angle of the wheel through a position of the rack bar. A method of mounting the sensor is divided into a method of attaching the sensor directly to the rack bar and a method of attaching the sensor to a separate device such as a pinion. A linear variable differential transformer (LVDT) sensor shall be applied when the sensor is attached directly to the rack bar. However, in a case of LVDT sensors, since a size is lengthened to detect a range of rack strokes of about 150 mm, there is a problem in which unit price of sensors increases and mass production decreases.

A method of attaching to a separate instrument such as a pinion is to mount an angle sensor instead of a torque sensor on the input pinion side of the existing R-MDPS (EPS). However, the existing input pinion structure is heat-treated on the pinion and rack bar, and there is a problem that cost is excessively consumed due to the large number of assembly parts such as a clearance compensation structure.

The related art of the present disclosure is disclosed in Korean Patent Application No. 10-2009-0116183 (published on Nov. 11, 2009 and entitled "The Support York Structure of The Steering Apparatus for Vehicle").

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of the present disclosure is to simplify a coupling structure of a steering angle sensor and provide a steering actuator apparatus for a vehicle capable of stably supporting a rack bar.

In an embodiment, a steering actuator apparatus for a vehicle according to the present disclosure includes: a housing; a driving unit configured to be supported by the housing and generates a driving force; a transmission shaft, which is installed inside the housing to be movable, moves back and forth by receiving the driving force from the driving unit, and varies a steering angle of a wheel; a measurement unit configured to measure the steering angle of the wheel in conjunction with a movement of the transmission shaft; a first rotation prevention unit provided between the housing and the transmission shaft and fixed to the transmission shaft; and a second rotation prevention unit, which is detachably coupled to an outside of the housing and interferes with the first rotation prevention unit to prevent relative rotation of the housing and the transmission shaft.

The transmission shaft may include a ball screw configured to convert the driving force generated from the driving unit into a straight line motion, and a rack bar extending from the ball screw and one side thereof engaged with the measurement unit.

The first rotation prevention unit may include a first body disposed to surround the other side of the rack bar, a first fixing unit extending from the first body and detachably fixed to an outer surface of the rack bar, and a first rotation prevention member which is concavely recessed from an outer surface of the first body and is coupled to the second rotation prevention unit.

The first body is made of plastic.

The first rotation prevention member is one in which a longitudinal direction thereof extends parallel to a longitudinal direction of the first body.

A plurality of the first rotation prevention members is provided and disposed to be spaced apart from each other at predetermined interval along a circumferential direction of the first body.

The second rotation prevention unit may include a second body in which one side is inserted penetrating an outer surface of the housing, a second rotation prevention member which extends from one side of the second body and is inserted into the first rotation prevention member to limit a rotation of the first body, and a second fixing unit extending from the other side of the second body and detachably fixed to the outer surface of the housing.

An end portion of the second rotation prevention member is formed to be curved with a curvature corresponding to a curvature of the first body.

The second fixing unit may includes a flange extending from the second body and disposed to face a coupling hole provided in the housing, a position adjustment hole formed to penetrate the flange and connects with the coupling hole, and a fastening member which is inserted into the position adjustment hole and fastened to the coupling hole.

A width of the position adjustment hole is greater than a width of the fastening member.

Furthermore, the measurement unit includes a pinion which engages with the rack bar for being combined therewith and rotates in conjunction with a movement of the rack bar, and a sensor coupled to the housing and measuring a rotation angle and a rotation direction of the pinion.

The pinion is formed in a shape of a spur gear.

The pinion is manufactured by an insert injection method.

Furthermore, the driving unit includes a power generator fixed to the housing and generating a rotational force, and a power transmission unit that transmits the rotational force generated by the power generator to the transmission shaft.

The power transmission unit may include a deceleration unit, which is connected to the power generator and amplifies the rotational force generated from the power generator, and a ball nut that is connected to the deceleration unit, and moves the transmission shaft.

The steering actuator apparatus for a vehicle according to the present disclosure may install a measurement unit in a rack bar without a separate component such as a clearance compensation structure or the like, thereby implementing an optimized package and reducing an assembly process.

Furthermore, in the steering actuator apparatus for a vehicle according to the present disclosure, the pinion is provided in the shape of a spur gear and is manufactured by an insert injection method, thereby preventing a division force in an axial direction generated in the pinion and reducing manufacturing costs.

The steering actuator apparatus for a vehicle according to the present disclosure may prevent the transmission shaft from rotating about the central axis inside the housing by the first rotation prevention unit and the second rotation prevention unit.

DETAILED DESCRIPTION OF THE ILLUSTRATED EMBODIMENTS

Figure 1:
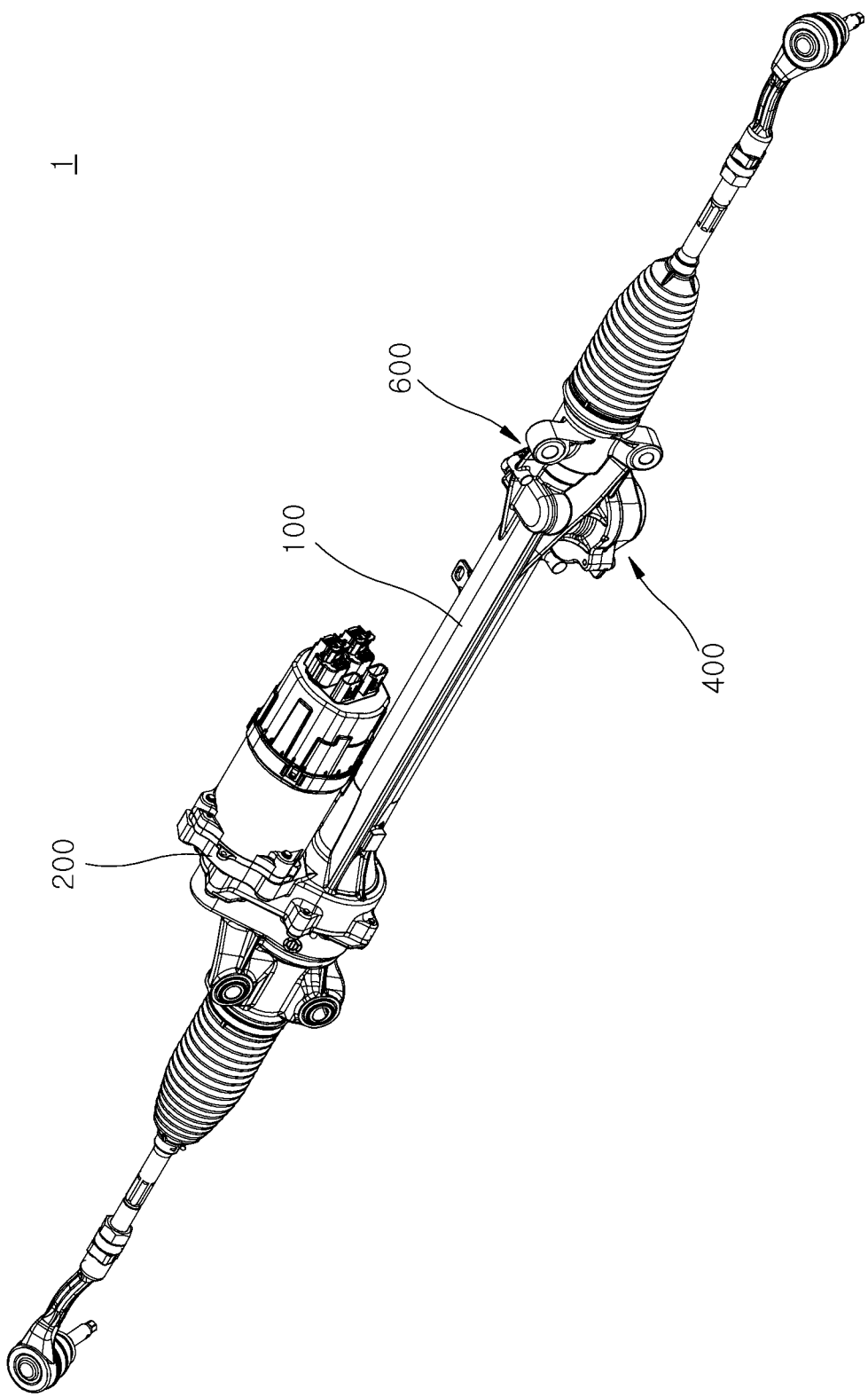
FIG. 1 is a perspective view schematically illustrating a configuration of a steering actuator apparatus for a vehicle according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
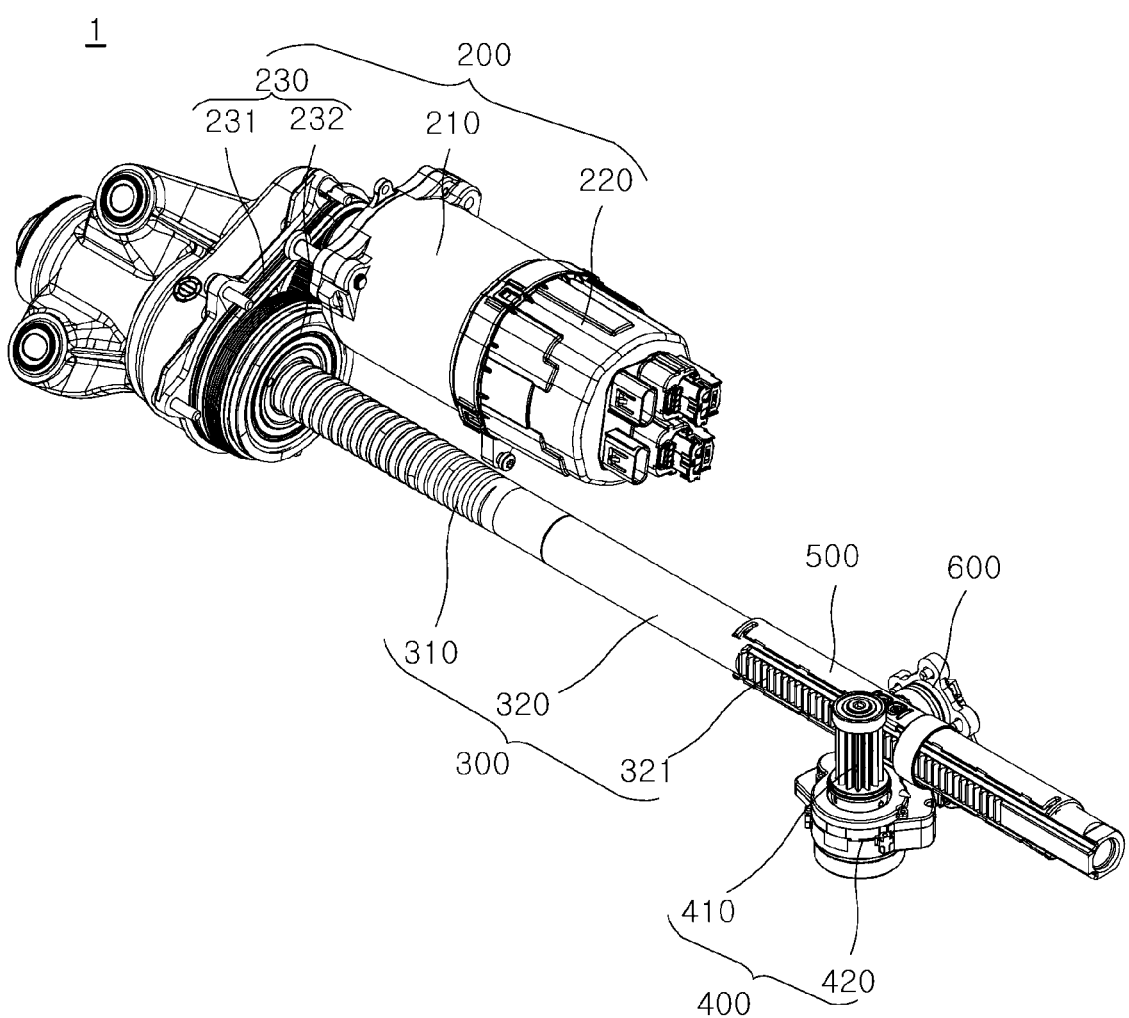
FIG. 2 is a perspective view schematically illustrating a configuration except for a housing of the steering actuator apparatus for a vehicle according to an embodiment of the present disclosure.
Figure 3:
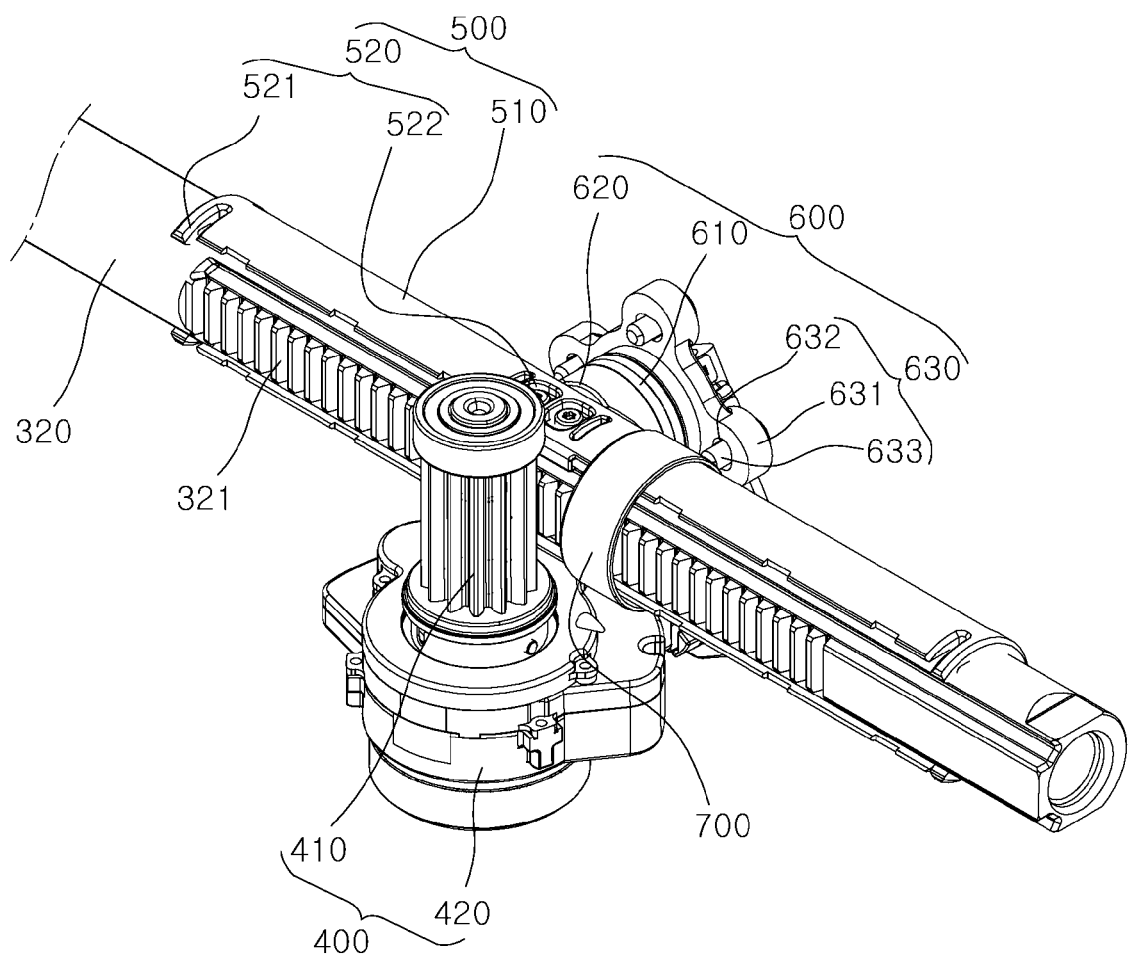
FIG. 3 is an enlarged perspective view schematically illustrating a configuration of the steering actuator apparatus for a vehicle according to an embodiment of the present disclosure.
Figure 4:
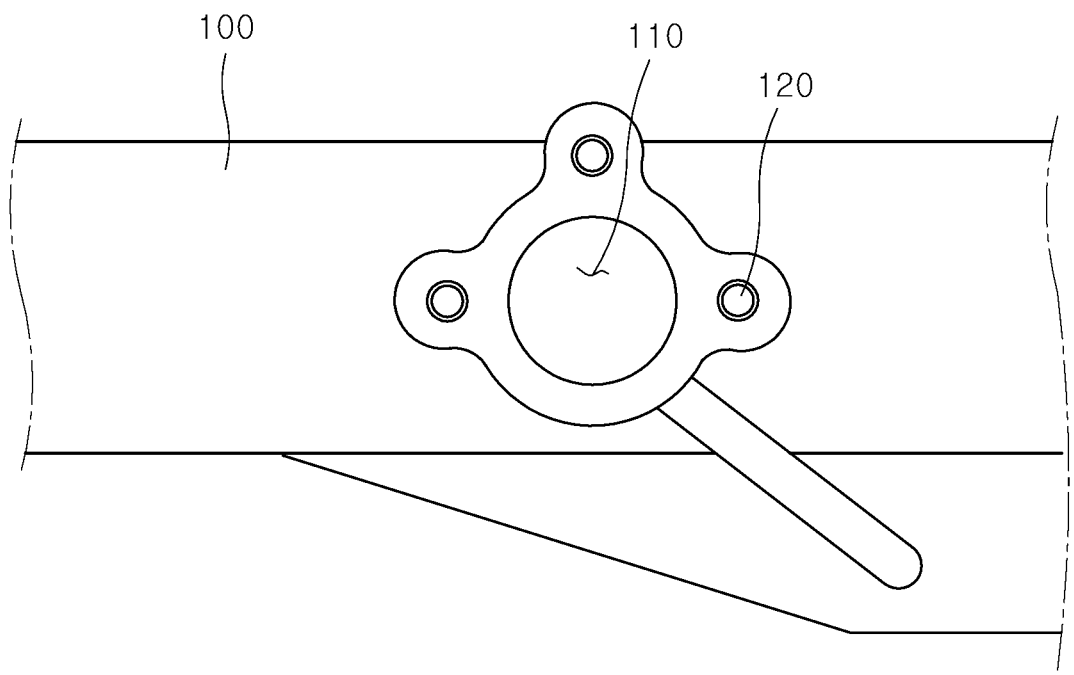
FIG. 4 is an enlarged perspective view illustrating the configuration of the steering actuator apparatus for a vehicle according to an embodiment of the present disclosure, which is a different perspective of FIG. 3.

FIG. 1 is a perspective view schematically illustrating a configuration of a steering actuator apparatus for a vehicle according to an embodiment of the present disclosure, FIG. 2 is a perspective view schematically illustrating a configuration except for a housing of the steering actuator apparatus for a vehicle according to an embodiment of the present disclosure, FIG. 3 is an enlarged perspective view schematically illustrating a configuration of the steering actuator apparatus for a vehicle according to an embodiment of the present disclosure, and FIG. 4 is an enlarged perspective view illustrating a configuration of the steering actuator apparatus for a vehicle according to an embodiment of the present disclosure, which is a different perspective of FIG. 3.

Referring to FIGS. 1 to 4, a steering actuator aperture for a vehicle 1 according to an embodiment of the present disclosure includes a housing 100, a driving unit 200, a transmission shaft 300, a measurement unit 400, a first rotation prevention unit 500, a second rotation prevention unit 600, and a flow prevention unit 700.

The housing 100 forms a schematic appearance of the steering actuator apparatus for a vehicle 1 according to an embodiment of the present disclosure and entirely supports the driving unit 200, the transmission shaft 300, the measurement unit 400, the first rotation prevention unit 500, and the flow prevention unit 700.

Figure 5:
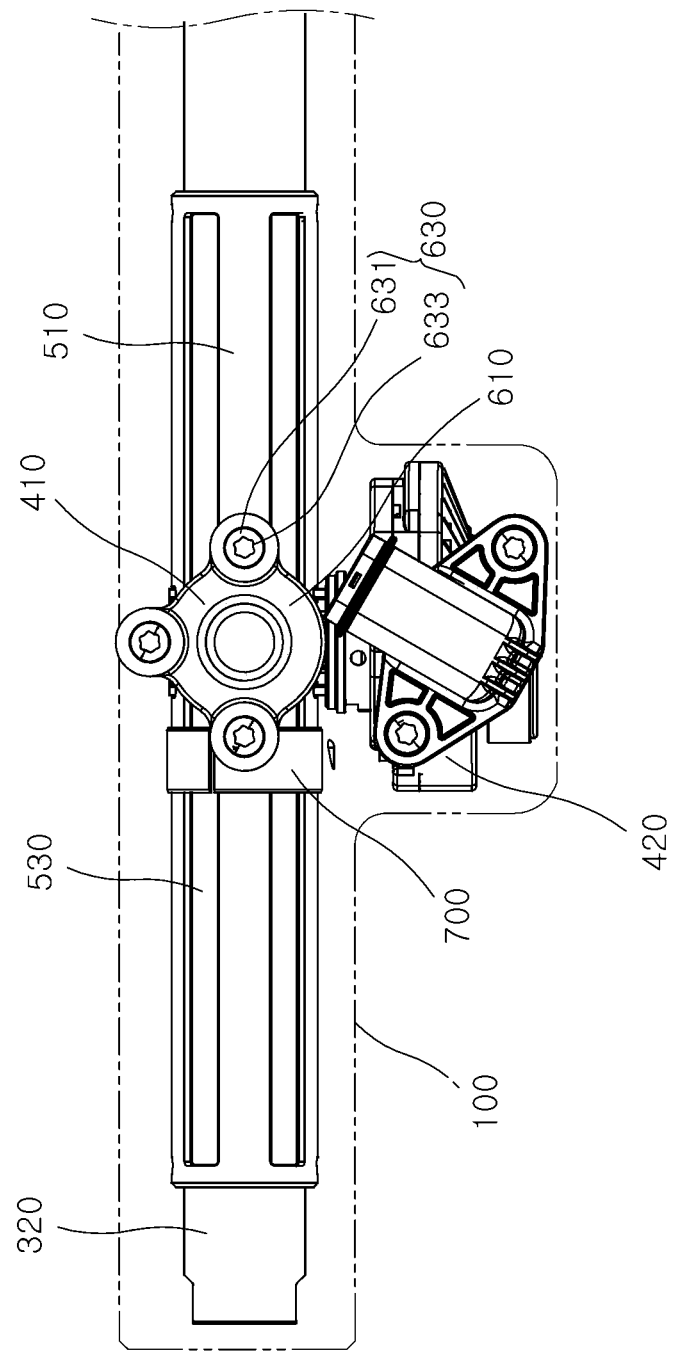
FIG. 5 is a front view schematically illustrating a configuration of a housing according to an embodiment of the present disclosure.

FIG. 5 is a front view schematically illustrating a configuration of a housing according to an embodiment of the present disclosure.

Referring to FIG. 5, the housing 100 according to an embodiment of the present disclosure may be formed to have a hollow cylindrical shape. The housing 100 is disposed in a longitudinal direction parallel to a width direction of a vehicle. The housing 100 may be fixed to and supported by a sub-frame (not illustrated) installed below the vehicle by bolting or the like. The specific shape of the housing 100 is not limited to the shape illustrated in FIG. 1, and various changes in design may be made within a technical idea of a shape capable of entirely supporting a configuration of the steering actuator apparatus for a vehicle 1 according to an embodiment of the present disclosure.

The housing 100 is provided with an insertion unit 110. The insertion unit 110 according to an embodiment of the present disclosure may be formed to have the shape of a hole formed through the outer surface of the housing 100. The insertion unit 110 is disposed to face the first rotation prevention unit 500, and the second rotation prevention unit 600 is inserted therein. That is, the insertion unit 110 provides a space in which the first rotation prevention unit 500 and the second rotation prevention unit 600 may pass through the housing 100 and be coupled to each other. A cross-sectional shape and extension length of the insertion unit 110 may be variously changed in design according to a shape of the second rotation prevention unit 600.

The housing 100 is provided with a coupling hole 120. The coupling hole 120 according to an embodiment of the present disclosure may be formed to have the shape of a hole formed through the outer surface of the housing 100. The coupling hole 120 is disposed to be spaced apart from the insertion unit 110 by a predetermined distance in the radial direction of the insertion unit 110. A plurality of the coupling holes 120 may be disposed to be spaced apart from each other along the circumferential direction of the insertion unit 110. On the inner circumferential surface of the coupling hole 120, a thread extending in a spiral shape along the longitudinal direction of the coupling hole 120 may be provided so as to be screw-coupled with a fastening member 633.

The driving unit 200 is supported by the housing 100 and generates a driving force to move a transmission shaft 300, which will be described later, back and forth in a straight line inside the housing 100.

The driving unit 200 according to an embodiment of the present disclosure includes a power generator 210, a control unit 220, and a power transmission unit 230.

The power generator 210 generates a rotational force by receiving power from the outside. The power generator 210 is fixed to the housing 100 to support overall the control unit 220 and the power transmission unit 230. The power generator 210 according to an embodiment of the present disclosure may be exemplified as various types of electric motors that convert power received from the outside, such as an AC, a DC BLDC motor, or the like into the rotational force. The power generator 210 may be fixed to an outer circumferential surface of the housing 100 by bolting, welding, or the like.

The control unit 220 is connected to the power generator 210 and controls an operation of the power generator 210 based on a measured value measured by a measurement unit 400 to be described later. The control unit 220 according to an embodiment of the present disclosure is coupled to one side of the power generator 210, and may be exemplified as various types of electronic control units (ECUs) capable of generally controlling the operation of the power generator 210, such as a rotation speed and whether or not the power generator 210 is rotated.

The power transmission unit 230 is connected to the power generator 210 and the transmission shaft 300, and transmits the rotational force generated from the power generator 210 to the transmission shaft 300.

The power transmission unit 230 according to an embodiment of the present disclosure may include a deceleration unit 231 and a ball nut 232.

The deceleration unit 231 is connected to the power generator 210 and reduces the rotational speed of the power generator 210 to amplify the rotational force transmitted to the ball nut 232. The deceleration unit 231 according to an embodiment of the present disclosure may include a driving pulley rotating with an output shaft of the power generator 210, a driven pulley connected to the ball nut 232, and a belt installed to surround the drive pulley and the driven pulley, configured to rotate the driven pulley in conjunction with a rotation of the driving pulley.

The ball nut 232 receives a rotational force from the deceleration unit 231 and moves the transmission shaft 300. The ball nut 232 according to an embodiment of the present disclosure may be formed to have the shape of a hollow ring disposed to surround an outer circumferential surface of the transmission shaft 300. The ball nut 232 is provided with a thread on the inner circumferential surface and is coupled to a ball screw 310 provided in the transmission shaft 300 through a motor such as a ball. When the power generator 210 is driven, the ball nut 232 is rotated about a central axis of the transmission shaft 300 together with the driven pulley.

The specific shape of the power transmission unit 230 is not limited to the shape illustrated in FIGS. 1 and 2, and various change in design may be made within the technical idea capable of transmitting the rotational force generated from the power generator 210 to the transmission shaft 300.

The transmission shaft 300 is installed inside the housing 100 to be movable in a direction parallel to the longitudinal direction of the housing 100. Both ends of the transmission shaft 300 are connected to a pair of tie rods (not illustrated) connected to the wheels of a vehicle, respectively. The transmission shaft 300 receives a driving force from the driving unit 200 and reciprocates inside the housing 100. The transmission shaft 300 varies an angle of the wheel by transmitting a force to a tie rod connected to both ends thereof as the transmission shaft 300 reciprocates inside the housing 100.

The transmission shaft 300 according to an embodiment of the present disclosure includes a ball screw 310 and a rack bar 320.

The ball screw 310 forms an outer appearance of one side of the transmission shaft 300. The ball screw 310 is connected to the driving unit 200 and converts a rotational force generated from the driving unit 200 into a straight motion. Accordingly, the ball screw 310 may induce the transmission shaft 300 to reciprocate in a straight line inside the housing 100. The ball screw 310 according to an embodiment of the present disclosure may be formed to have the shape of a rod having a thread provided on an outer circumferential surface thereof. The ball screw 310 is disposed in a longitudinal direction parallel to the longitudinal direction of the housing 100. An outer circumferential surface of the ball screw 310 is coupled to an inner circumferential surface of the ball nut 232 through a rolling element such as a ball.

The rack bar 320 extends from the ball screw 310 to form the other side appearance of the transmission shaft 300. The rack bar 320 according to an embodiment of the present disclosure may be formed to have the shape of a rod extending from one end (right end with reference to FIG. 2) of the ball screw 310 in a direction parallel to the longitudinal direction of the ball screw 310. The rack bar 320 may be integrally manufactured with the ball screw 310, may be manufactured as a separate product from the ball screw 310, and coupled to the ball screw 310. A rack gear 321 is formed on one side surface of the rack bar 320 in a longitudinal direction of the rack bar 320. The rack gear 321 may be formed in the shape of a steel gear that does not heat treatment. The rack gear 321 is engaged with a pinion 410 for being combined therewith provided in the measurement unit 400.

The measurement unit 400 measures a steering angle of the wheel in conjunction with a movement of the transmission shaft 300. More specifically, the measurement unit 400 indirectly measures the steering angle of the wheel using a moving direction and a moving distance inside the housing 100 of the transmission shaft 300. The measurement unit 400 is connected to the control unit 220 by a wirelessly or wired manner to transmit a measured data to the control unit 220.

Figure 6:
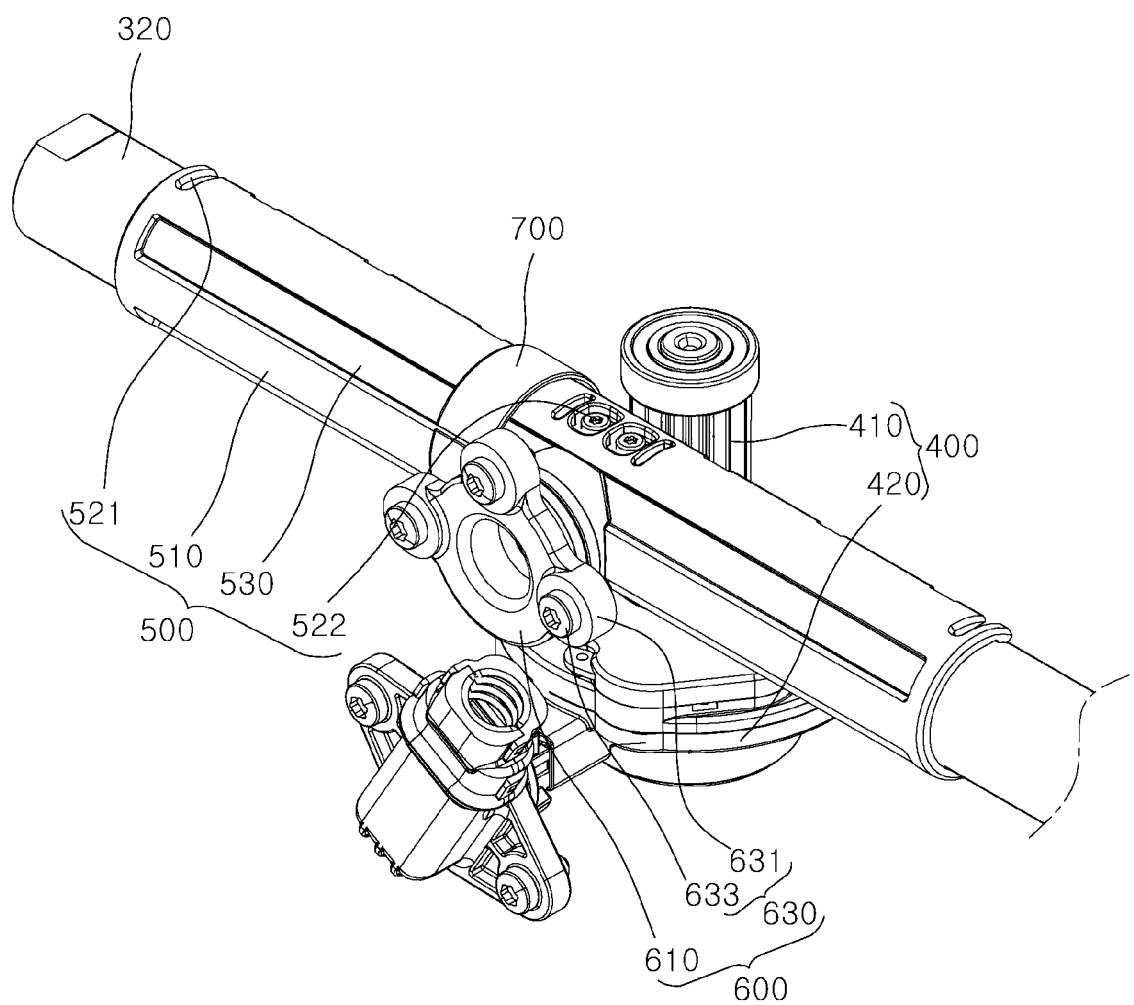
FIG. 6 is a front view schematically illustrating a configuration of a measurement unit according to an embodiment of the present disclosure.

FIG. 6 is a front view schematically illustrating a configuration of a measurement unit according to an embodiment of the present disclosure.

Referring to FIGS. 1 to 6, the measurement unit 400 according to an embodiment of the present disclosure includes a pinion 410 and a sensor 420.

The pinion 410 is engaged with the rack bar 320 for being combined therewith and rotates in conjunction with a movement of the rack bar 320. A central axis of the pinion 410 according to an embodiment of the present disclosure is disposed in a direction perpendicular to a longitudinal direction of the transmission shaft 300. An outer circumferential surface the pinion 410 is engaged with the rack gear 321 for being combined therewith. The pinion 410 rotates clockwise or counterclockwise about the central axis by the rack gear 321 engaged for being combined therewith when the transmission shaft 300 moves.

In the case of a SBW system, a mechanical connection between a steering shaft and the transmission shaft 300 is not required, so that the pinion 410 may be provided in the shape of a spur, that is, a flat gear. Accordingly, when the pinion 410 rotates in conjunction with the rack gear 321, it is possible to prevent a generation of division force in the pinion 410 in the axial direction, so that the pinion 410 may be made of a plastic material with relatively low rigidity compared to the previous one. In this case, the pinion 410 may be manufactured by an insert injection method without additional gear teeth processing. Accordingly, the pinion 410 may be easily manufactured and reduce manufacturing costs due to conventional heat treatment processing or the like.

The sensor 420 is coupled to the housing 100 and rotatably supports the pinion 410. The sensor 420 is provided to measure a rotation angle and a rotation direction of the pinion 410 rotated by the rack bar 320. The sensor 420 is connected to the control unit 220 by a wirelessly or wired manner to transmit the measured data to the control unit 220. The sensor 420 according to an embodiment of the present disclosure may include a case that is fixed to the outer circumferential surface of the housing 100 by bolting, welding, or the like to rotatably support the pinion 410, and various types of rotation angle sensors built into the case to measure the pinion 410.

A first rotation prevention unit 500 is provided between the housing 100 and the transmission shaft 300 and is fixed to the transmission shaft 300. A second rotation prevention unit 600 is detachably coupled to the outside of the housing 100 and interferes with the first rotation prevention unit 500 to prevent relative rotation of the housing 100 and the transmission shaft 300. More specifically, the first rotation prevention unit 500 and the second rotation prevention unit 600 are disposed inside and outside the housing 100 respectively with respect to the housing 100, so that the transmission shaft 300 is provided to allow the transmission shaft 300 to reciprocate in the longitudinal direction of the housing 100 and to prevent the transmission shaft 300 from rotating around the central axis inside the housing 100. Accordingly, for the pinion 410 and the rack gear 321 are provided in the shape of a spur-type gear, during steering operation, it is possible to prevent the transmission shaft 300 from rotating around the central axis inside the housing 100 by the rotational moment from the axle shaft or the like.

Figure 7:
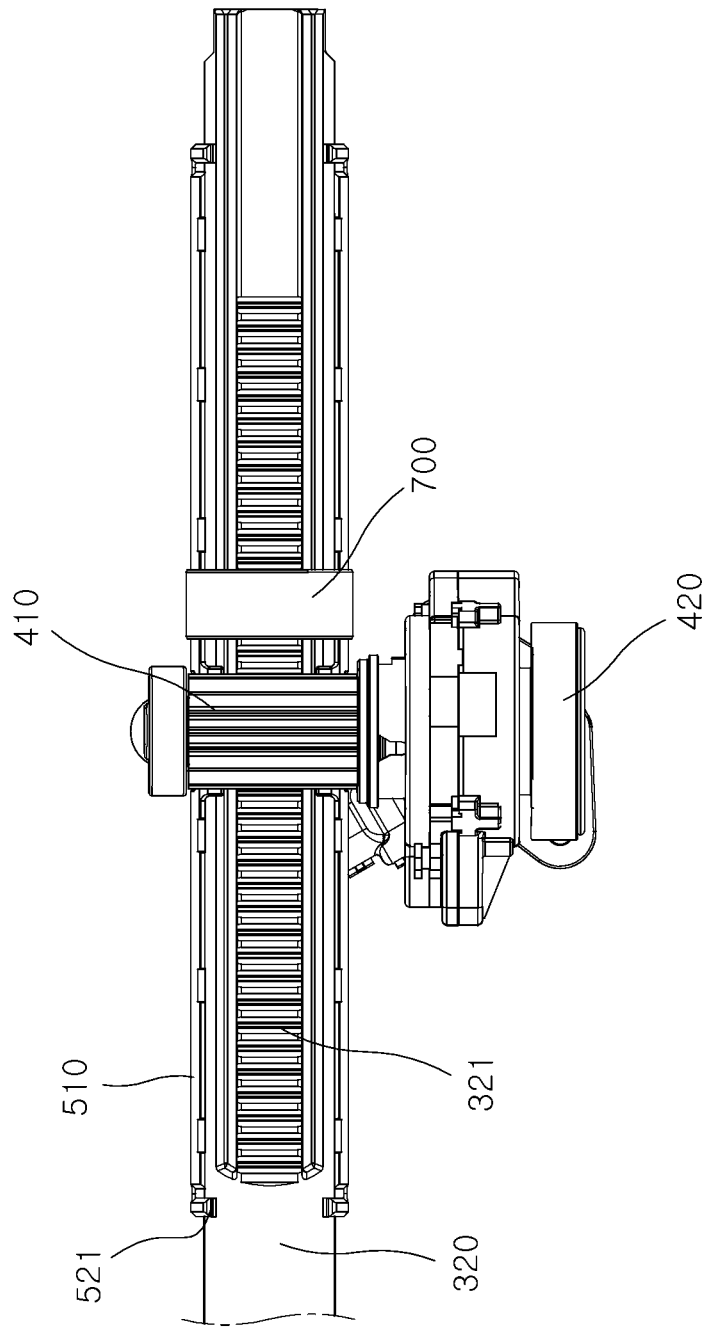
FIG. 7 is a top view schematically illustrating an installation state of a first rotation prevention unit and a second rotation prevention unit according to an embodiment of the present disclosure.
Figure 8:
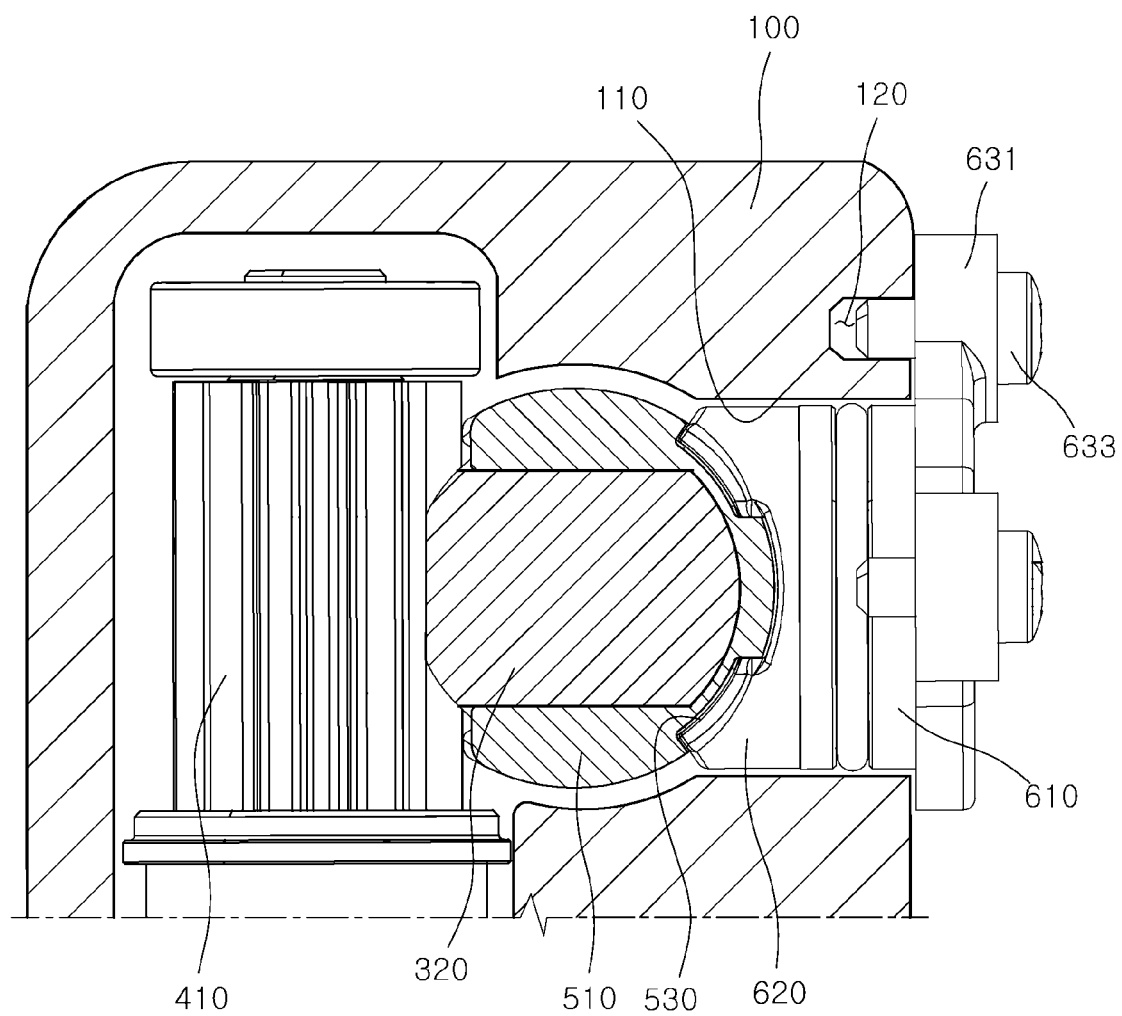
FIG. 8 is a cross-sectional view schematically illustrating an installation state of the first rotation prevention unit and the second rotation prevention unit according to an embodiment of the present disclosure.
Figure 9A:
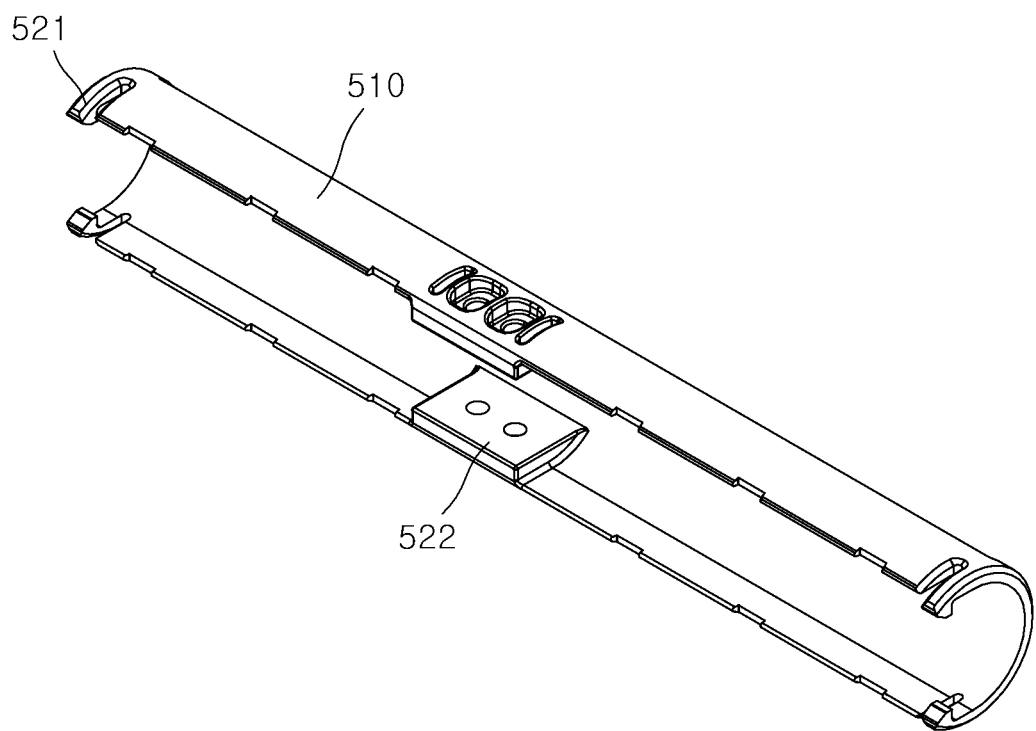
FIGS. 9A and 9B are a perspective view schematically illustrating a configuration of the first rotation prevention unit according to an embodiment of the present disclosure.
Figure 9B:
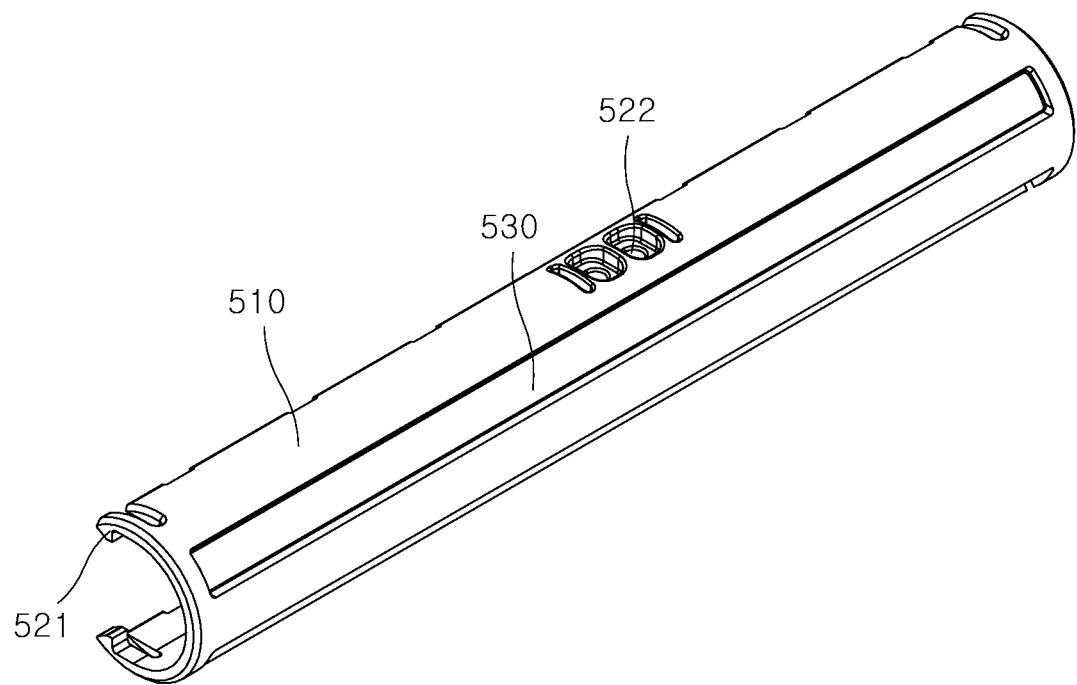
Figure 10:
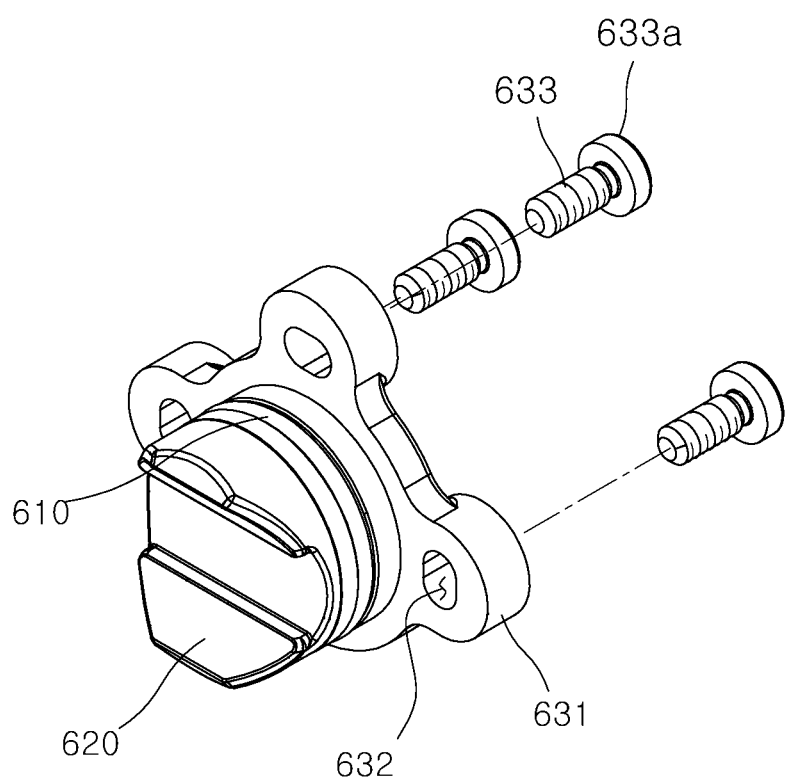
FIG. 10 is a perspective view schematically illustrating a configuration of the second rotation prevention unit according to an embodiment of the present disclosure.

FIG. 7 is a top view schematically illustrating an installation state of a first rotation prevention unit and a second rotation prevention unit according to an embodiment of the present disclosure, FIG. 8 is a cross-sectional view schematically illustrating an installation state of the first rotation prevention unit and the second rotation prevention unit according to an embodiment of the present disclosure, FIGS. 9A and 9B are a perspective view schematically illustrating a configuration of the first rotation prevention unit according to an embodiment of the present disclosure, and FIG. 10 is a perspective view schematically illustrating a configuration of the second rotation prevention unit according to an embodiment of the present disclosure.

Referring to FIGS. 7 to 10, the first rotation prevention unit 500 according to an embodiment of the present disclosure includes a first body 510, a first fixing unit 520, and a first rotation prevention member 530.

The first body 510 forms a schematic appearance of the first rotation prevention unit 500 according to an embodiment of the present disclosure, and entirely supports the first fixing unit 520 and the first rotation prevention member 530. The first body 510 according to an embodiment of the present disclosure may be formed to have the shape of a hollow cylinder one side opened. The first body 510 is disposed to surround the circumference of the other side of the rack bar 320, that is, the circumference surface of the rack bar 320 without the rack gear 321. The opened side of the first body 510 is disposed to face the rack gear 321 to expose the rack gear 321 to the outside. The first body 510 is integrally coupled to the rack bar 320 through the first fixing unit 520 and moves back and forth in a straight line with the rack bar 320. The first body 510 may be disposed to be spaced apart from the inner surface of the housing 100 by a predetermined distance so that the outer surface thereof does not interfere with the housing 100 when the rack bar 320 moves back and forth in a straight line. The first body 510 may be made of a plastic material that is light in weight and easy to manufacture and process.

The first fixing unit 520 extends from the first body 510 and is detachably fixed to the outer surface of the rack bar 320. Accordingly, the first fixing unit 520 may prevent the first body 510 from rotating relative to the rack bar 320 or moving relative to the longitudinal direction of the rack bar 320. The first fixing unit 520 according to an embodiment of the present disclosure includes a hook unit 521 protruding from both ends of the first body 510 in a ring shape and caught and coupled to the outer surface of the rack bar 320 and a bolting unit 522 extending from the center of the first body 510 in the circumferential direction of the first body 510 and coupled by bolting to the outer surface of the rack bar 320.

The first rotation prevention member 530 may be formed to have the shape of a groove that is concavely recessed from the outer surface of the first body 510. The first rotation prevention member 530 is caught and coupled to the second rotation prevention unit 600 to prevent the relative rotation of the first body 510 with respect to the housing 100. The first rotation prevention member 530 according to an embodiment of the present disclosure is formed to have a substantially rectangular cross-section and extends in a longitudinal direction parallel to the longitudinal direction of the first body 510. Accordingly, the first rotation prevention member 530 may limit the rotation of the first body 510 in the circumferential direction of the housing 100 and allow the first body 510 to move back and forth in a straight line along the longitudinal direction of the housing 100 when the first rotation prevention member 530 is caught and coupled to the second rotation prevention unit 600. A plurality of the first rotation prevention members 530 may be provided and disposed to be spaced apart from each other at predetermined interval along the circumferential direction of the first body 510. Although FIG. 6 illustrates that a pair of the first rotation prevention members 530 are provided as an example, the number of the first rotation prevention members 530 is not limited to these matters, and various changes in design may be made into three, four, or the like.

Referring to FIGS. 7 to 10, the second rotation prevention unit 600 according to an embodiment of the present disclosure includes a second body 610, a second rotation prevention member 620, and a second fixing unit 630.

The second body 610 forms the central appearance of the second rotation prevention unit 600 according to an embodiment of the present disclosure, and entirely supports the second rotation prevention member 620 and the second fixing unit 630. The second body 610 according to an embodiment of the present disclosure is formed to have a substantially cylindrical shape, and one side thereof (left side with reference to FIG. 8) passes through the insertion unit 110 and is inserted through the outer surface of the housing 100. A diameter of the second body 610 may be formed to be smaller than a diameter of the insertion unit 110.

The second rotation prevention member 620 extends from one side of the second body 610 and is inserted into the first rotation prevention member 530 to limit the rotation of the first body 510. The second rotation prevention member 620 according to an embodiment of the present disclosure may be formed to have the shape of a protrusion protruding from one end of the second body 610 inserted through the insertion unit 110 toward the first body 510. The end of the second rotation prevention member 620 is inserted into the first rotation prevention member 530 concavely recessed from the outer surface of the first body 510 and is caught and coupled to the first rotation prevention member 530. In this case, the inner surface of the end portion of the second rotation prevention member 620 may be formed to be curved with a curvature corresponding to a curvature of the first body 510. Accordingly, the inner surface of the end portion of the second rotation prevention member 620 may stably adhere to the bottom surface of the first rotation prevention member 530 to prevent separation from the first rotation prevention member 530. A plurality of the second rotation prevention members 620 may be provided and individually be inserted into each of the first rotation prevention members 530. The number and protruding angle of the second rotation prevention member 620 may be variously changed in design depending on the number and arrangement state of the first rotation prevention member 530.

The second fixing unit 630 extends from the other side of the second body 610 and is detachably fixed to the outer surface of the housing 100 to support the second body 610 with respect to the housing 100.

Figure 11:
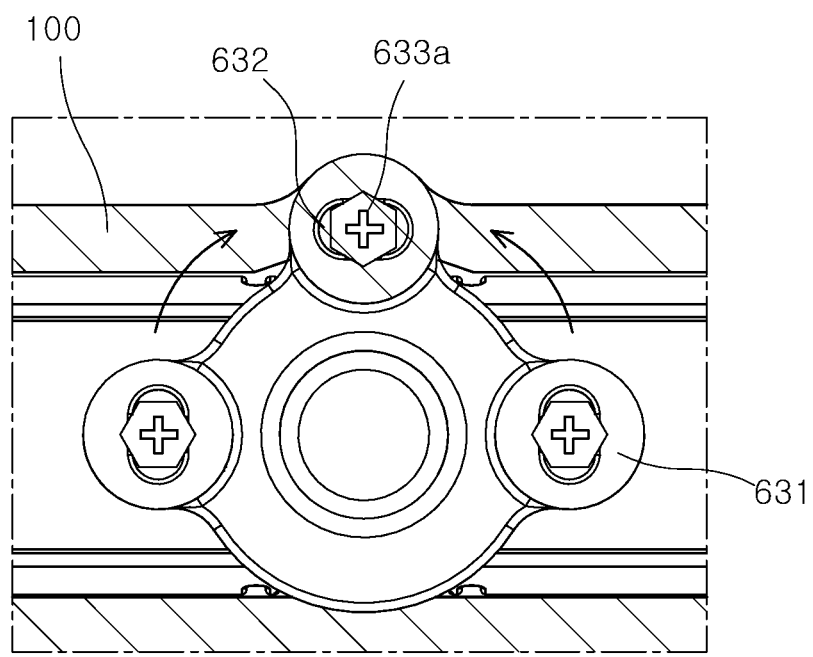
FIG. 11 is a front view schematically illustrating the configuration of a second fixing unit according to an embodiment of the present disclosure.

FIG. 11 is a front view schematically illustrating the configuration of a second fixing unit according to an embodiment of the present disclosure.

Referring to FIGS. 6 to 11, the second fixing unit 630 according to an embodiment of the present disclosure includes a flange 631, a position adjustment hole 632, and a fastening member 633.

The flange 631 extends from the second body 610 and is disposed to face the coupling hole 120 provided in the housing 100. The flange 631 according to an embodiment of the present disclosure may be formed to have the shape of a plate extending in a radial direction of the second body 610 from the other end portion (right side with reference to FIG. 8). A plurality of the flanges 631 may be provided and disposed to be spaced apart from each other in the circumferential direction of the second body 610. In this case, the flange 631 may be formed in a number corresponding to a plurality of the coupling holes 120. A plurality of the flanges 631 are disposed such that the inner side thereof faces each of the coupling holes 120.

The position adjustment hole 632 is formed to penetrate the flange 631 and connects with the coupling hole 120. The position adjustment hole 632 according to an embodiment of the present disclosure may be formed to have the shape of a hole vertically penetrating the outer surface and the inner surface of the flange 631.

The fastening member 633 is inserted into the position adjustment hole 632 and fastened to the coupling hole 120. The fastening member 633 according to an embodiment of the present disclosure may be formed to have the shape of a rod having a circular cross section. One end portion of the fastening member 633 penetrates the position adjustment hole 632 and is inserted into the coupling hole 120. The fastening member 633 may be provided with a thread extending in a spiral shape along the longitudinal direction of the fastening member 633 on the outer circumferential surface so as to be screwed with the coupling hole 120.

A head portion 633a extending in the radial direction of the fastening member 633 may be provided at the other end portion of the fastening member 633. A width of the head portion 633a is formed to be greater than one of the left and right sides or one of the upper and lower sides of the position adjustment hole 632. The head portion 633a is disposed such that an inner side surface thereof faces the flange 631. As the fastening member 633 is inserted into the position adjustment hole 632 by a predetermined distance or more, the inner surface of the head portion 633a is in close contact with the flange 631 to press and fix the flange 631 to the housing 100.

A width of the position adjustment hole 632 may be formed to be greater than a width of the fastening member 633. The position adjustment hole 632 according to an embodiment of the present disclosure may be formed in the shape of a long hole with a substantially elliptical cross section. In this case, the vertical and horizontal widths of the position adjustment hole 632 are formed to be larger than the width of the fastening member 633. Either the vertical width or the horizontal width of the position adjustment holes 632 is formed to be smaller than the width of the head portion 633a. Accordingly, when the fastening member 633 and the coupling hole 120 are temporarily assembled, that is, when the head portion 633a is spaced apart from the flange 631, a position of the second body 610 is adjusted within the range between the position adjustment hole 632 and the fastening member 633, and the second body 610 may prevent the second rotation prevention member 620 from being inserted in a state that deviates from the first rotation prevention member 530 and induce smooth slide movement of the first body 510.

Hereinafter, an assembly process of the first rotation prevention unit 500 and the second rotation prevention unit 600 according to an embodiment of the present disclosure will be described.

First, the first body 510 fixed to the outer surface of the rack bar 320 through the first fixing unit 520 is disposed inside the housing 100.

Thereafter, one side of the second body 610 is inserted into the insertion unit 110.

In the process of inserting one side of the second body 610 into the insertion unit 110, the second rotation prevention member 620 is inserted deviating from the first rotation prevention member 530, and a jamming phenomenon between the second rotation prevention member 620 and the first rotation prevention member 530 may occur.

In order to solve this jamming phenomenon, the fastening member 633 is temporarily assembled to the coupling hole 120 and the position of the second body 610 is adjusted.

More specifically, as the fastening member 633 is not completely inserted into the coupling hole 120, the inner surface of the head portion 633a is spaced apart from the outer surface of the flange 631. Accordingly, the second body 610 may be moved left and right, up and down within a range of a gap between the position adjustment hole 632 and the fastening member 633, or may be rotated about the central axis thereof, and the coupling position with respect to the housing 100 may be adjusted.

Then, the second body 610 moves the rack bar 320 left and right along the longitudinal direction of the housing 100 and correctly mounts the second rotation prevention member 620 on the first rotation prevention member 530.

Thereafter, the fastening member 633 is completely inserted into the coupling hole 120 to fix the flange 631 to the housing 100.

A flow prevention unit 700 supports the transmission shaft 300 inside the housing 100. More specifically, the flow prevention unit 700 prevents the transmission shaft 300 from moving out of a normal position and flowing in the radial direction of the housing 100 inside the housing 100. Accordingly, the flow prevention unit 700 may prevent the transmission shaft 300 from being jammed or colliding with an inner wall of the housing 100 due to deflection or the like. The flow prevention unit 700 according to an embodiment of the present disclosure is formed to have the shape of a hollow ring and is inserted between the inner circumferential surface of the housing 100 and the outer circumferential surface of the transmission shaft 300. The flow prevention unit 700 is disposed on one side (right side with reference to FIG. 3) with respect to the measurement unit 400. The outer circumferential surface of the flow prevention unit 700 pressed into and fixed to the inner circumferential surface of the housing 100. The inner circumferential surface of the flow prevention unit 700 is in contact with the transmission shaft 300, and more specifically, the outer circumferential surface of the rack bar 320 on which the rack gear 321 is formed. The inner circumferential surface of the flow prevention unit 700 may be made of a material having a low friction coefficient so as to stably support the transmission shaft 300 and not to interfere excessively with the movement of the transmission shaft 300.

Although exemplary embodiments of the present disclosure have been disclosed for illustrative purposes, those skilled in the art will appreciate that various modifications, additions and substitutions are possible, without departing from the scope and spirit of the disclosure as defined in the accompanying claims. Thus, the true technical scope of the present disclosure should be defined by the following claims.

What is claimed is:

1. A steering actuator apparatus for a vehicle, comprising;
   a housing;
   a driving unit configured to be supported by the housing and generate a driving force;
   a transmission shaft, installed inside the housing, adapted to move back and forth by receiving the driving force from the driving unit, and vary a steering angle of a wheel;
   a measurement unit configured to measure the steering angle of the wheel in conjunction with a movement of the transmission shaft;
   a first rotation prevention unit provided between the housing and the transmission shaft and fixed to the transmission shaft; and
   a second rotation prevention unit detachably coupled to an outside of the housing and interferes with the first rotation prevention unit to prevent relative rotation of the housing and the transmission shaft.

2. The steering actuator apparatus of claim 1, wherein the transmission shaft comprises:
   a ball screw configured to convert the driving force generated from the driving unit into a straight line motion; and
   a rack bar extending from the ball screw and having one side thereof engaged with the measurement unit.

3. The steering actuator apparatus of claim 2, wherein the first rotation prevention unit comprises:
   a first body disposed to surround another side of the rack bar;
   a first fixing unit extending from the first body and being detachably fixed to an outer surface of the rack bar; and
   a first rotation prevention member concavely recessed from an outer surface of the first body and being coupled to the second rotation prevention unit.

4. The steering actuator apparatus of claim 3, wherein the first body is made of plastic.

5. The steering actuator apparatus of claim 3, wherein the first rotation prevention member has a longitudinal direction thereof that extends parallel to a longitudinal direction of the first body.

6. The steering actuator apparatus of claim 5, wherein a plurality of the first rotation prevention members is provided and disposed to be spaced apart from each other at predetermined intervals along a circumferential direction of the first body.

7. The steering actuator apparatus of claim 3, wherein the second rotation prevention unit comprises:
a second body in which one side is inserted penetrating an outer surface of the housing;
a second rotation prevention member which extends from one side of the second body and is inserted into the first rotation prevention member to limit a rotation of the first body; and
a second fixing unit extending from the other side of the second body and detachably fixed to the outer surface of the housing.

8. The steering actuator apparatus of claim 7, wherein an end portion of the second rotation prevention member is formed to be curved with a curvature corresponding to a curvature of the first body.

9. The steering actuator apparatus of claim 7, wherein the second fixing unit comprises:
a flange extending from the second body and disposed to face a coupling hole provided in the housing;
a position adjustment hole formed to penetrate the flange and connect with the coupling hole; and
a fastening member inserted into the position adjustment hole and fastened to the coupling hole.

10. The steering actuator apparatus of claim 9, wherein a width of the position adjustment hole is greater than a width of the fastening member.

11. The steering actuator apparatus of claim 2, wherein the measurement unit comprises:
a pinion that engages with the rack bar and rotates in conjunction with a movement of the rack bar; and
a sensor coupled to the housing adapted to measure a rotation angle and a rotation direction of the pinion.

12. The steering actuator apparatus of claim 11, wherein the pinion is formed in a shape of a spur gear.

13. The steering actuator apparatus of claim 12, wherein the pinion is manufactured by an insert injection method.

14. The steering actuator apparatus of claim 1, wherein the driving unit comprises:
a power generator fixed to the housing and adapted to generate a rotational force; and
a power transmission unit adapted to transmit the rotational force generated by the power generator to the transmission shaft.

15. The steering actuator apparatus of claim 14, wherein the power transmission unit comprises:
a deceleration unit connected to the power generator and adapted to amplify the rotational force generated from the power generator; and
a ball nut that is connected to the deceleration unit, and adapted to move the transmission shaft.

* * * * *